(12) United States Patent
Costa (10) Patent No.: US 9,546,745 B2
(45) Date of Patent: Jan. 17, 2017

(54) BI-DIRECTIONAL ROLLER ASSEMBLY

(71) Applicant: Mueller International, LLC, Atlanta, GA (US)

(72) Inventor: Carlos Costa, Somerset, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 14/685,154

(22) Filed: Apr. 13, 2015

(65) Prior Publication Data
US 2016/0298794 A1 Oct. 13, 2016

(51) Int. Cl.
*F16L 3/16* (2006.01)
*F16L 3/18* (2006.01)

(52) U.S. Cl.
CPC .................................... *F16L 3/18* (2013.01)

(58) Field of Classification Search
CPC ............... F16L 3/18; F16L 3/20; F16L 3/16; F16L 3/202; F16L 3/205; F16L 3/2053; F16L 3/2056; F16L 3/21
USPC ....................... 248/49, 55; 384/58
See application file for complete search history.

(56) References Cited

U.S. PATENT DOCUMENTS

| | | | |
|---|---|---|---|
| 827,575 A * | 7/1906 | Smead | F16L 3/18 213/42 |
| 1,056,312 A * | 3/1913 | Woodroof | F16L 3/16 248/251 |
| 1,429,756 A | 9/1922 | Mitchell | |
| 1,541,129 A * | 6/1925 | Farley | F16L 3/18 248/55 |
| 1,600,835 A | 9/1926 | Manley | |
| 1,601,199 A | 9/1926 | Clapper | |
| 2,103,811 A * | 12/1937 | Davis | F16L 3/18 248/55 |
| 2,652,282 A | 9/1953 | Willetts | |
| 2,742,319 A | 4/1956 | Tobin | |
| 2,860,007 A | 11/1958 | Cornelius | |
| 3,016,219 A | 1/1962 | Murphy | |
| 3,298,644 A | 1/1967 | Sherburne | |
| 3,313,557 A | 4/1967 | Sheppard | |
| 3,390,854 A | 7/1968 | Sherburne | |
| 3,677,189 A | 7/1972 | Appelt | |
| 3,963,205 A * | 6/1976 | Hageman | F16L 3/16 248/55 |
| 4,515,195 A | 5/1985 | Gladstein | |
| 4,826,113 A | 5/1989 | Winters | |
| 5,028,019 A * | 7/1991 | Hardtke | F16L 3/18 248/49 |
| 5,217,191 A | 6/1993 | Smith | |
| 5,564,669 A | 10/1996 | Wu | |
| 5,685,508 A | 11/1997 | Smith | |
| 5,816,554 A | 10/1998 | McCracken | |

(Continued)

FOREIGN PATENT DOCUMENTS

EP 1398552 3/2004

*Primary Examiner* — Christopher E Garft
(74) *Attorney, Agent, or Firm* — Taylor English Duma LLP (57) ABSTRACT

A roller assembly comprises a base; a pedestal movably positioned on the base; and a roller fixably positioned relative to the pedestal and movable axially relative to the base. A method of assembling a roller assembly comprises mounting a pedestal on a base of the roller assembly such that the pedestal is movable relative to the base; and fixably positioning a roller relative to the pedestal such that the roller is movable axially relative to the base.

17 Claims, 8 Drawing Sheets

(56) References Cited

U.S. PATENT DOCUMENTS

| | | |
|---|---|---|
| 5,829,718 A | 11/1998 | Smith |
| 5,855,342 A | 1/1999 | Hawkins et al. |
| 5,906,341 A | 5/1999 | Brown |
| 6,017,005 A | 1/2000 | Smith |
| D427,049 S | 6/2000 | Neider et al. |
| 6,206,613 B1 | 3/2001 | Elkins |
| 6,305,650 B1 | 10/2001 | Hawkins et al. |
| 6,592,093 B2 | 7/2003 | Valentz |
| 6,679,461 B1 | 1/2004 | Hawkins |
| 6,863,253 B2 | 3/2005 | Valentz et al. |
| 7,475,513 B2 * | 1/2009 | Parker .................. F16L 3/1091 248/49 |
| 7,661,240 B2 | 2/2010 | Sargent |
| 7,708,235 B2 | 5/2010 | Hawkins |
| 7,770,344 B2 | 8/2010 | Betz |
| 8,181,916 B2 | 5/2012 | Azuma et al. |
| 8,312,692 B2 | 11/2012 | Krovats |
| 2002/0020787 A1 * | 2/2002 | Parker ...................... F16L 3/18 248/70 |
| 2008/0145151 A1 | 6/2008 | Rodrigue |
| 2014/0197282 A1 | 7/2014 | Turner |
| 2014/0339375 A1 * | 11/2014 | Birch ..................... F16C 13/04 248/49 |

* cited by examiner

BI-DIRECTIONAL ROLLER ASSEMBLY

TECHNICAL FIELD

This disclosure relates to roller assemblies. More specifically, this disclosure relates to bi-directional roller assemblies.

BACKGROUND

Pipelines may be mounted aboveground, belowground, or a combination of the two. One way of mounting pipelines aboveground is through the use of a pipe roller assembly. A pipe roller assembly may be mounted to a pipeline and a mounting surface and holds the pipeline in position. The pipe roller assembly allows for some movement of the pipeline longitudinally along the axis of the pipeline due to, for example, expansion and contraction of the pipeline or seismic events. A conventional pipe roller assembly accommodates longitudinal pipe movement relative to the pipe roller assembly while allowing little to no lateral, or side-to-side, movement relative to the pipe roller assembly. However, in various pipeline environments utilizing a pipe roller assembly, movement of various segments of pipe of the pipeline occurs in both the longitudinal and lateral direction relative to the pipe roller assembly. For example, bi-directional movement of a pipeline may occur in any industry that utilizes high temperature pipelines to accommodate thermal expansion of the pipeline or an industry where seismic events may occur. Therefore pipe roller assemblies are occasionally subject to forces in a lateral direction relative to the pipeline, which can potentially damage typical pipe roller assemblies or the pipes on the assemblies or cause the assemblies to fail.

SUMMARY

Disclosed is a roller assembly comprising: a base; a pedestal movably positioned on the base; and a roller fixably positioned relative to the pedestal and movable axially relative to the base.

Also disclosed is a method of assembling a roller assembly, the method comprising: mounting a pedestal on a base of the roller assembly such that the pedestal is movable relative to the base; and fixably positioning a roller relative to the pedestal such that the roller is movable axially relative to the base.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a roller assembly and associated methods, systems, devices, and various apparatus. The roller assembly includes a base, a pedestal, and a roller. It would be understood by one of skill in the art that the disclosed roller assembly is described in but a few exemplary embodiments among many. No particular terminology or description should be considered limiting on the disclosure or the scope of any claims issuing therefrom.

Figure 1:
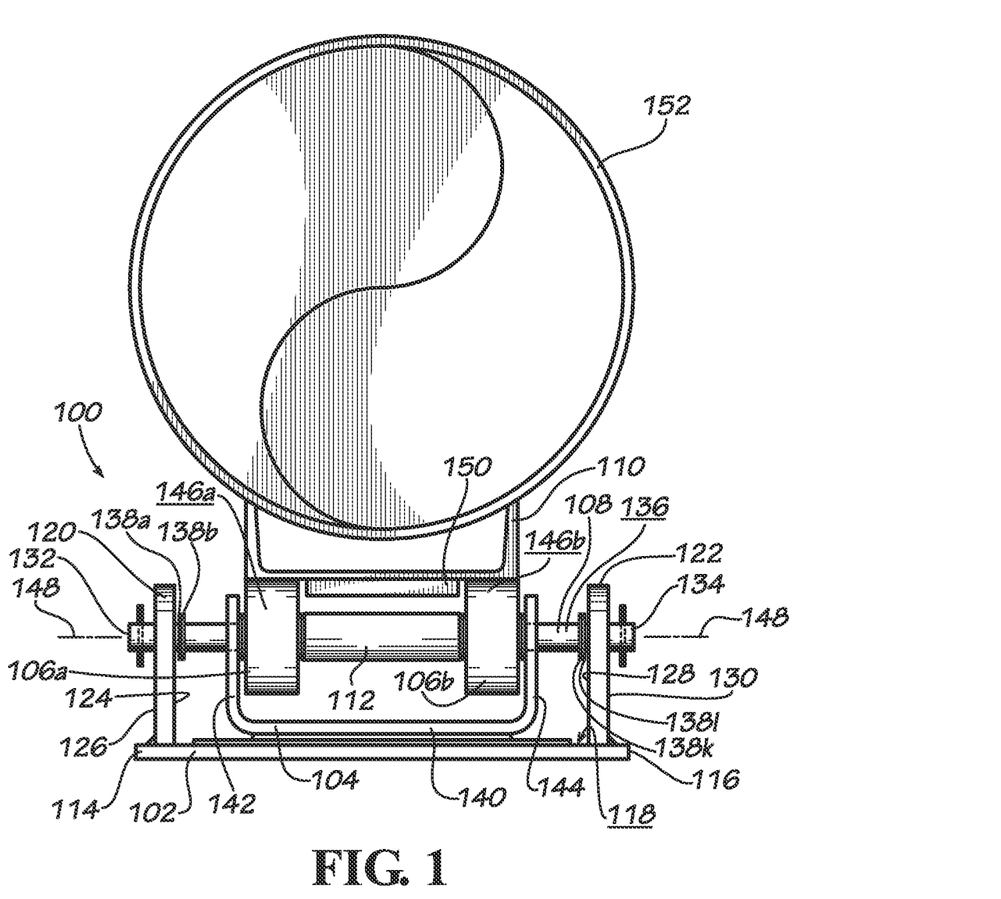
FIG. 1 is a front view of a roller assembly according to one embodiment of the present disclosure with a pipe, the roller assembly including a base, a pedestal, a roller, and a pipe shoe.

One embodiment of a roller assembly 100 is disclosed and described in FIG. 1. The roller assembly 100 includes a base 102, a pedestal 104, and a roller 106a. In various embodiments, the roller assembly 100 includes two rollers 106a,b; however the number of rollers should not be considered limiting on the current disclosure. As shown in FIG. 1, in various embodiments, the roller assembly 100 includes a roller shaft 108. In various embodiments, the roller assembly 100 includes a shoe 110. As shown in FIG. 1, in various embodiments, the roller assembly 100 includes a spacer 112.

As shown in FIG. 1, in various embodiments, the base 102 includes a first end 114, a second end 116, and a base surface 118 extending between the first end 114 and the second end 116. In various embodiments, a first lug 120 is positioned on the base surface 118 proximate to the first end 114 and a second lug 122 is positioned on the base surface 118 proximate to the second end 116. As shown in FIG. 1, in various embodiments, the first lug 120 includes an inner side 124 and an outer side 126. In various embodiments, the first lug 120 defines a roller shaft opening 208 (shown in FIG. 2) extending through the first lug 120 from the inner side 124 to the outer side 126. In various embodiments, the second lug 122 includes an inner side 128 and an outer side 130. In various embodiments, the second lug 122 defines a roller shaft opening 210 (shown in FIG. 2) extending through the second lug 122 from the inner side 128 to the outer side 130.

In various embodiments, the roller shaft 108 includes a first end 132, a second end 134, and an outer surface 136 extending between the first end 132 and the second end 134. In various embodiments, the roller shaft 108 defines an axis 148. As shown in FIG. 1, in various embodiments, the roller shaft 108 is supported by the first lug 120 and the second lug 122 in the roller assembly 100. In various embodiments, the roller assembly 100 includes a plurality of washers 138a,b, c,d,e,f,g,h,i,j,k,l (shown in FIG. 2) that are movably positioned on the roller shaft 108 between the first lug 120 and the second lug 122. The number of washers should not be considered limiting on the current disclosure. As shown in FIG. 1, in various embodiments, the pedestal 104, rollers 106a,b, and spacer 112 are movably positioned on the roller shaft 108.

In various embodiments, the pedestal 104 includes a bottom panel 140, a first pedestal arm 142, and a second pedestal arm 144. In various embodiments, the first pedestal arm 142 defines a first pedestal opening 212 (shown in FIG. 2) and the second pedestal arm 144 defines a second pedestal opening 214 (shown in FIG. 2). As shown in FIG. 1, in various embodiments, the pedestal 104 is positioned in the roller assembly 100 such that the first pedestal arm 142 and second pedestal arm 144 are movably positioned on the roller shaft 108. In these embodiments, movably positioning the pedestal arms 142,144 on the roller shaft 108 movably positions the pedestal 104 on the roller shaft 108. As will be described below with reference to FIG. 2, in various embodiments, the roller assembly 100 includes a movement mechanism 220 (shown in FIG. 2) such that the pedestal assembly 104 is movable relative to the base 102.

As shown in FIG. 1, in various embodiments, the rollers 106a,b are movably positioned on the roller shaft 108 between the first pedestal arm 142 and the second pedestal arm 144. When the rollers 106a,b are positioned between the arms 142,144, the rollers 106a,b are fixably positioned on the roller shaft 108 relative to the pedestal 104 such that the rollers 106a,b can freely rotate but have substantially limited movement along axis 148 relative to the pedestal 104 and the rollers 106a,b are substantially held at a single position along the shaft 108 relative to the pedestal 104, although some minor axial movement between the first pedestal arm 142 and the second pedestal arm 144 may be present due to small spaces between the rollers 106a,b, spacer 112, washers 138c,d,e,f,g,h,i,j, the first pedestal arm 142, and the second pedestal arm 144 along the roller shaft 108. However, the rollers 106,a,b are nonetheless fixably positioned relative to the pedestal 104 to the extent that movement of the pedestal 104 relative to the base 102 causes substantially similar movement of the rollers 106a,b and movement of the rollers 106a,b relative to the base 102 causes substantially similar movement of the pedestal 104. In addition, the rollers 106a,b are fixably positioned relative to the pedestal 104 such that, when a pipe 152 (shown in FIG. 1) is mounted, either directly or indirectly, on the rollers 106a,b, the rollers 106a,b do not substantially move axially relative to the pedestal 104.

Figure 2:
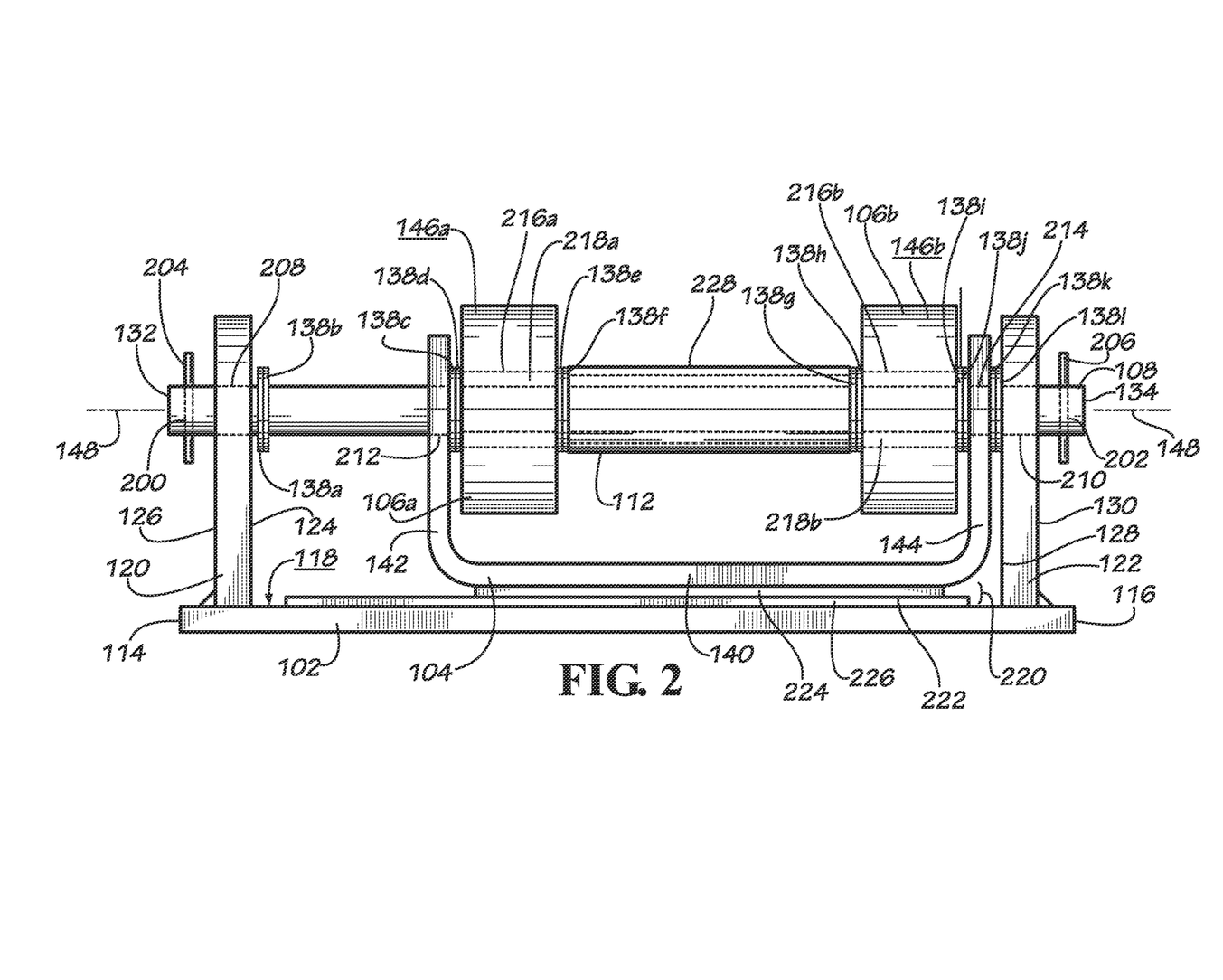
FIG. 2 is a detailed front view of the base, pedestal, and roller of FIG. 1.

Although the rollers 106a,b are fixably positioned on the roller shaft 108 relative to the pedestal 104, the rollers 106a,b are rotatable on the roller shaft 108 and can rotate about axis 148. As shown in FIG. 1, the rollers 106a,b define rolling surfaces 146a,b. As shown in FIG. 2, in various embodiments, the rollers 106a,b define roller openings 216a,b such that the roller shaft 108 is insertable through the roller openings to position the rollers 106a,b on the roller shaft 108. In various embodiments, the spacer 112 is movably positioned on the roller shaft 108 between the roller 106a and roller 106b to space the rollers 106a,b from each other.

As shown in FIG. 1, in various embodiments, the shoe 110 is seated on the rolling surfaces 146a,b of the rollers 106a,b. In various embodiments, a keeper 150 is attached to the shoe 110. Although the shoe 110 and keeper 150 are described as two separate elements, in various other embodiments, the keeper 150 may be integrally formed with the shoe 110. In various embodiments, the keeper 150 ensures that shoe 110 remains positioned on the rollers 106a,b. As shown in FIG. 1, in various embodiments, the shoe 110 is used to support a piping element such as the pipe 152. As will be described below, in various embodiments, the rollers 106a,b permit the shoe 110 and pipe 152 to move in a direction substantially perpendicular to axis 148. In various other embodiments, no shoe 110 is present and the pipe 152 may rest directly on the rollers 106a,b or on another structure between the rollers 106a,b and the pipe 152, such as a wear plate.

FIG. 2 shows an enlarged view of the base 102, pedestal 104, and rollers 106a,b. As shown in FIG. 2, the roller shaft 108 extends through the first lug 120, the first pedestal arm 142, the roller 106a, the spacer 112, the roller 106b, the second pedestal arm 144, and the second lug 122. In various embodiments, the roller shaft 108 defines a first pin opening 200 through the roller shaft 108 proximate to the first end 132 and a second pin opening 202 through the roller shaft 108 proximate to the second end 134. In various embodiments, a first pin 204 is positioned in the first pin opening 200 and a second pin 206 is positioned in the second pin opening 202. As shown in FIG. 2, in various embodiments, the pins 204,206 contain the roller shaft 108 between the lugs 120,122 in the roller assembly 100 while allowing the roller shaft 108 to rotate. In various embodiments, the pins 204,206 are cotter pins; however, in various other embodiments, various other types of pins, retaining clips, nuts, washers, caps, or other devices may be utilized to contain the roller shaft 108 on the lugs 120,122.

As shown in FIG. 2, the first lug 120 defines the roller shaft opening 208 and the second lug 122 defines the roller shaft opening 210. The roller shaft 108 is inserted through the roller shaft openings 208,210 such that the roller shaft 108 is supported by the lugs 120,122 in various embodiments.

In various embodiments, the first pedestal arm 142 defines the first pedestal opening 212 extending through the first pedestal arm 142 and the second pedestal arm 144 defines the second pedestal opening 214 extending through the second pedestal arm 144. As shown in FIG. 2, in various embodiments, the pedestal 104 is positioned on the roller shaft 108 such that the roller shaft 108 extends through the first pedestal opening 212 and the second pedestal opening 214.

As shown in FIG. 2, in various embodiments, the rollers 106a,b are annular and define roller openings 216a,b extending through the rollers 106a,b. The rollers 106a,b are mounted on the roller shaft 108 such that the center of axis of each rollers 106a,b is coaxial with the center axis of the roller shaft 108. In various embodiments, bearings 218a,b are positioned in the roller openings 216a,b around the roller shaft 108 such that the bearings 218a,b are between the rollers 106a,b and the roller shaft 108. In various embodiments, the bearings 218a,b permit the rollers 106a,b to rotate about the roller shaft 108.

The spacer 112 is substantially cylindrical and defines a spacer opening 228 in various embodiments, as shown in FIG. 2. When the roller assembly 100 is assembled, the spacer 112 is positioned on the roller shaft 108 such that the roller shaft 108 extends through the spacer opening 228. In various embodiments, the diameter of the spacer opening 228 may be larger than the diameter of the roller shaft 108. In these embodiments, the spacer 112 may hang on the roller shaft 108 due to gravity such that the center axis of the spacer 112 is not aligned with the center axis of the roller shaft 108. The spacer 112 spaces roller 106a and roller 106b apart from one another to prevent contact and relative movement between the roller 106a and the roller 106b along the roller shaft 108. The spacer 112 is positioned on the roller shaft 108 between rollers 106a,b and between the pedestal arms 142,144. When positioned on the roller shaft 108, the spacer 112 is fixably positioned on the roller shaft 108 relative to the pedestal 104 similarly to rollers 106a,b such that the spacer 112 has substantially limited movement along axis 148 relative to the pedestal 104 and the spacer 112 is substantially held at a single position along the shaft 108 relative to the pedestal 104.

In various embodiments, the roller assembly 100 includes a movement mechanism 220 for movably positioning the pedestal 104 laterally, or side-to-side, relative to the base 102. In various embodiments, the movement mechanism 220 is a slide bearing system 222 having a first sliding plate 224 and a second sliding plate 226. As will be described in greater detail below, in various embodiments, the first sliding plate 224 is attached to the bottom panel 140 and the second sliding plate 226 is attached to the base 102 on the base surface 118. Although a slide bearing system 222 is described, in various other embodiments, the movement mechanism 220 is any mechanism enabling the pedestal 104 to be movable relative to the base 102, such as rollers, ball bearings, various types of tracks or slides, or polished or oiled surfaces of the base 102, pedestal 104, or elements therebetween. When the pedestal 104 moves relative to the base 102 via the movement mechanism 220, the components of the roller assembly 100 positioned on the roller shaft 108 between the pedestal arms 142,144 move with the pedestal 104 relative to the base 102 while remaining fixably positioned relative to the pedestal 104.

Figure 3:
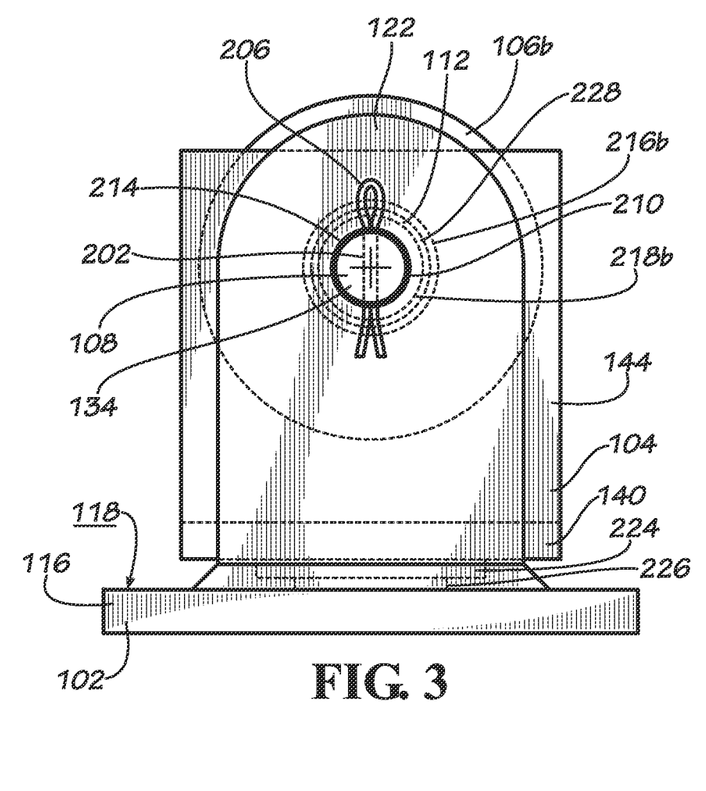
FIG. 3 is a side view of the base, pedestal, and roller of FIG. 1.

FIG. 3 shows a side view of the base 102, pedestal 104, roller 106b, roller shaft 108, and spacer 112 assembled. As shown in FIG. 3, the roller shaft 108 extends through the aligned roller shaft opening 210, second pedestal opening 214, roller opening 216b, bearing 218b, and spacer opening 228.

Figure 4:
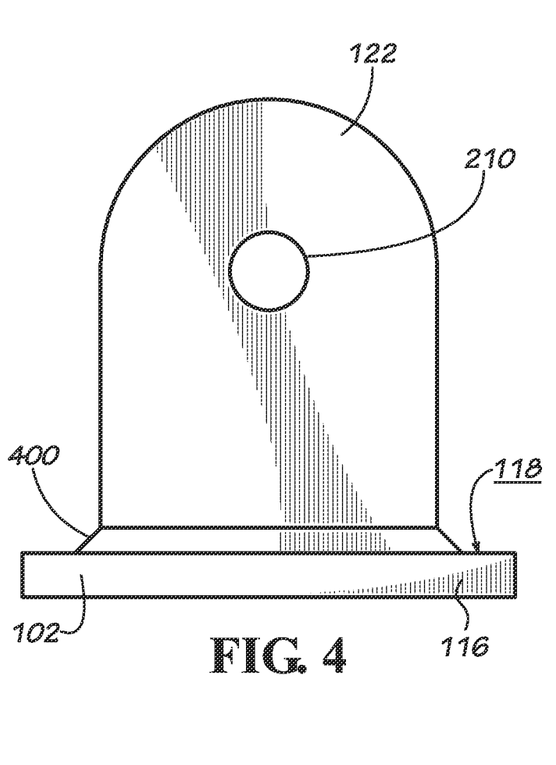
FIG. 4 is a side view of the base of FIG. 1.

FIG. 4 shows a side view of the base 102 with the second lug 122 attached on the base surface 118 proximate or near to the second end 116. In various embodiments, the lugs 120,122 are attached to the base 102 through mechanisms including, but not limited to, welding, bolting, riveting, adhesive joining, or various other attaching mechanisms. FIG. 4 shows a lug foot 400 attaching the second lug 122 to the base 102. In various embodiments, the lugs 120,122

Figure 5:
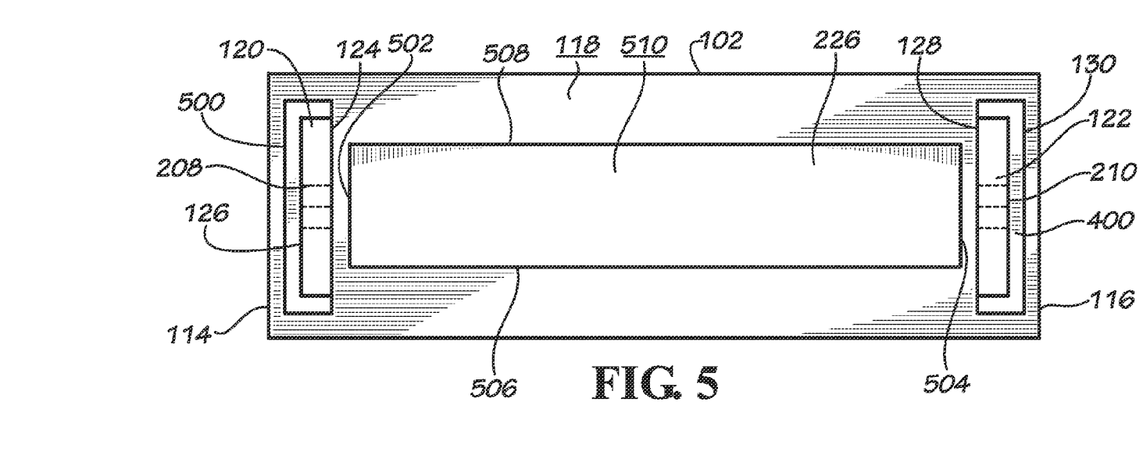
FIG. 5 is a top view of the base of FIG. 1.

FIG. 5 shows a top view of the base 102. As shown in FIG. 5, in various embodiments, a lug foot 500 attaches and secures the first lug 120 to the base surface 118 proximate to the first end 114 and the lug foot 400 attaches and secures the second lug 122 to the base surface 118 proximate to the second end 116. As shown in FIG. 5, in various embodiments, the inner side 124 of the first lug 120 does not include lug foot 500 and the inner side 128 of the second lug 122 does not include lug foot 400.

As described above, in various embodiments, the roller assembly 100 includes the movement mechanism 220 (shown in FIG. 2). In various embodiments where the movement mechanism 220 is a slide bearing system 222 (shown in FIG. 2), the slide bearing system 222 includes the second sliding plate 226 attached to the base 102. As shown in FIG. 5, in various embodiments, the second sliding plate 226 is attached to the base surface 118 between the first lug 120 and the second lug 122. In various embodiments, the second sliding plate 226 is attached to the base 102 with an attachment mechanisms including, but not limited to, welding, bolting, riveting, adhesive joining, or various other attaching mechanisms. In various embodiments, at least one spot weld attaches the second sliding plate 226 to the base 102. As shown in FIG. 5, in various embodiments, the second sliding plate 226 includes a first end 502, a second end 504, a front end 506, and a back end 508 and defines a sliding surface 510 between ends 502,504,506,508 on which the first sliding plate 224 is movably positioned.

Figure 6:
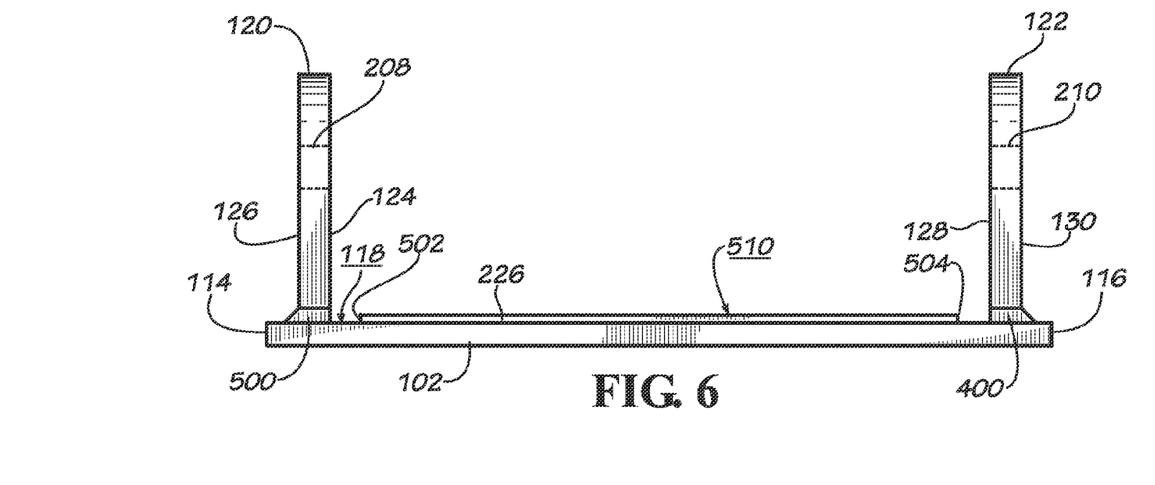
FIG. 6 is a front view of the base of FIG. 1.

FIG. 6 shows a front view of the base 102 with the first lug 120, the second lug 122, and second sliding plate 226 attached to the base 102.

Figures 7, 8:
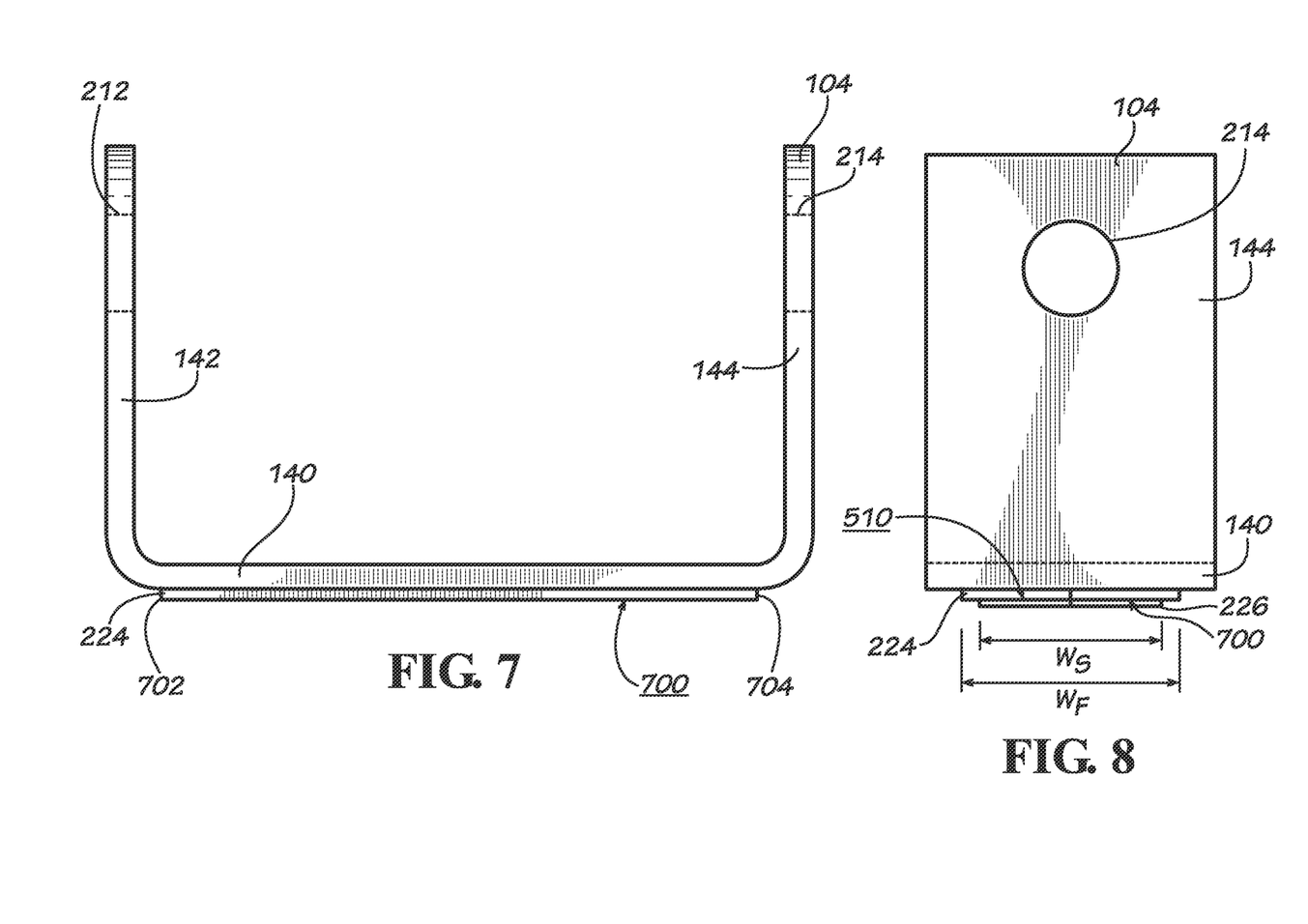
FIG. 7 is a front view of the pedestal of FIG. 1.
FIG. 8 is a side view of the pedestal of FIG. 1.

FIG. 7 shows a front view of the pedestal 104. As shown in FIG. 7, the pedestal 104 includes the bottom panel 140, the first pedestal arm 142, and the second pedestal arm 144. In various embodiments, the first pedestal arm 142 defines the first pedestal opening 212 and the second pedestal arm 144 defines the second pedestal opening 214. As described above, in various embodiments, the roller assembly 100 includes the movement mechanism 220 (shown in FIG. 2). In various embodiments where the movement mechanism 220 is a slide bearing system 222 (shown in FIG. 2), the slide bearing system 222 includes the first sliding plate 224 attached to the pedestal 104. As shown in FIG. 7, in various embodiments, the first sliding plate 224 is attached to the bottom panel 140 with an attachment mechanism from the group including, but not limited to, welding, bolting, riveting, adhesive joining, or various other attaching mechanisms. In various embodiments, at least one spot weld attaches the first sliding plate 224 to the pedestal 104. As shown in FIG. 7, in various embodiments, the first sliding plate 224 includes a first end 702, a second end 704 and defines a sliding surface 700.

FIG. 8 shows a side view of the pedestal 104 slidably positioned on the second sliding plate 226. As shown in FIG. 8, the first sliding plate 224 is positioned on the second sliding plate 226 such that the sliding surface 700 is in contact with sliding surface 510. As shown in FIG. 8, in various embodiments, a width $W_F$ of the first sliding plate 224 is greater than a width $W_S$ of the second sliding plate 226. In various embodiments, the different widths $W_F$ and $W_S$ may maintain a constant sliding surface area and prevent the sliding surface 510 of the second sliding plate 226 from being exposed to contaminants while in operation, though in various other embodiments $W_F$ may be less than or equal to $W_S$.

In various embodiments, the first sliding plate 224 and second sliding plate 226 are constructed from materials that reduce friction, wear, and energy consumption such as various metals and plastics. In various embodiments, the material is polytetrafluoroethylene (PTFE). In various embodiments, the material is a PTFE-based material with reinforcing agents. In various embodiments, the PTFE-based material with glass fiber reinforcing agents such as the material sold under the trade name FLUOROGOLD® by Saint-Gobain, Aurora, Ohio. In various other embodiments, the first sliding plate 224 and second sliding plate 226 are constructed from other materials that reduce friction, wear, and energy consumption to enable the first sliding plate 224 to be movably positioned along the second sliding plate 226. In various embodiments, the elements 224,226 may further be coated with protective coatings to protect the elements 224,226 from working environments. In various embodiments, the coating may be an anti-corrosion coating such as Carbon Zinc #11. In various other embodiments, various other protective coatings may be applied to the elements 224,226.

Figure 9:
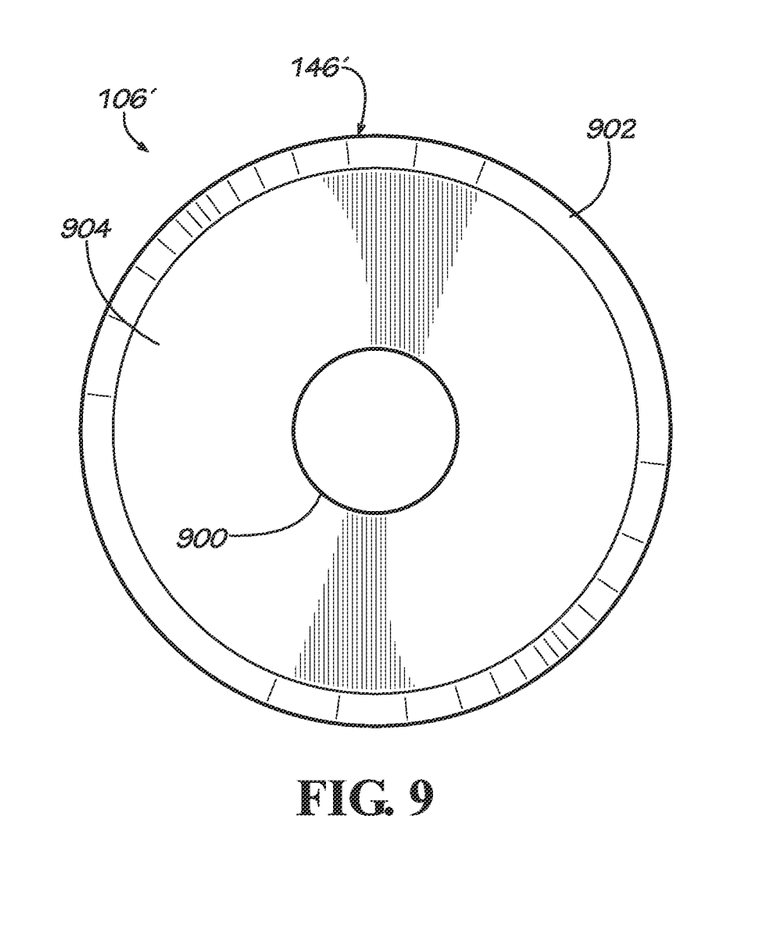
FIG. 9 is a front view of a roller according to another embodiment of the current disclosure.
Figure 10:
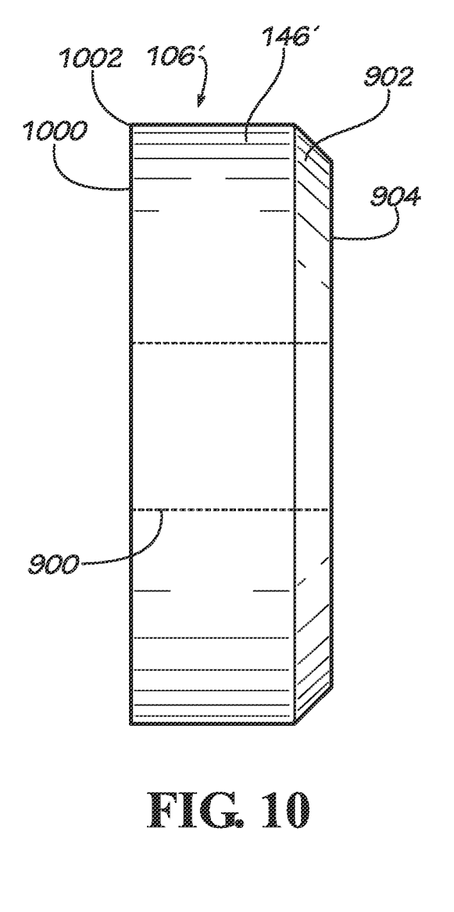
FIG. 10 is a side view of the roller of FIG. 9.

FIG. 9 shows a front view of another embodiment of a roller 106'. Similar to rollers 106a,b, roller 106' defines a rolling surface 146' and a roller opening 900. In various embodiments roller 106' further defines a tapered edge 902 between the rolling surface 146' and a first side 904. FIG. 10 shows a side view of the roller 106'. As shown in FIG. 10, in various embodiments, the roller 106' defines the one tapered edge 902 between the rolling surface 146' and the first side 904 while the edge 1002 between the rolling surface 146' and a second side 1000 is not tapered. In various embodiments, both edges 902,1002 may be tapered. In various embodiments, at least two rollers 106' may be utilized in the roller assembly 100 in place of rollers 106a,b. In these embodiments, one roller 106' is positioned on the roller shaft 108 between the spacer 112 and the first pedestal arm 142 such that the first side 904 and tapered edge 902 of the one roller 106' face the first pedestal arm 142. Another roller 106' is positioned on the roller shaft 108 between the spacer 112 and the second pedestal arm 144 such that the first side 904 and tapered edge 902 of the another roller 106' face the second pedestal arm 144. In various embodiments, the presence of tapered edge 902 allows for a smaller sized pedestal 104 with shorter side arms 142,144 to be used because the tapered edge 902 prevents the roller 106' from contacting, scraping, or damaging the joint or weld between the pedestal bottom panel 140 and the side arms 142,144 and prevents the joint or weld from impeding rotation of the roller 106'.

Figure 11:
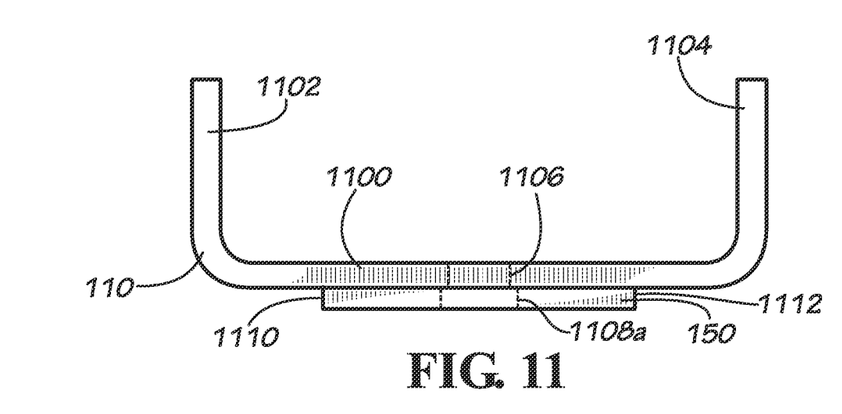
FIG. 11 is a front view of the pipe shoe of FIG. 1.

FIG. 11 shows a front view of the shoe 110 with the keeper 150. As shown in FIG. 11, the shoe 110 includes a shoe bottom panel 1100, a first shoe arm 1102, and a second shoe arm 1104. In various embodiments, the keeper 150 is attached to the shoe 110 with an attachment mechanism from the group including, but not limited to, welding, bolting, riveting, adhesive joining, or various other attaching mechanisms. As shown in FIG. 11, in various embodiments, the shoe bottom panel 1100 defines a shoe drain hole 1106a and the keeper 150 defines a keeper drain hole 1108a. When the keeper 150 is attached to the shoe 110, the keeper drain hole 1108a is aligned with the shoe drain hole 1106a.

Figure 12:
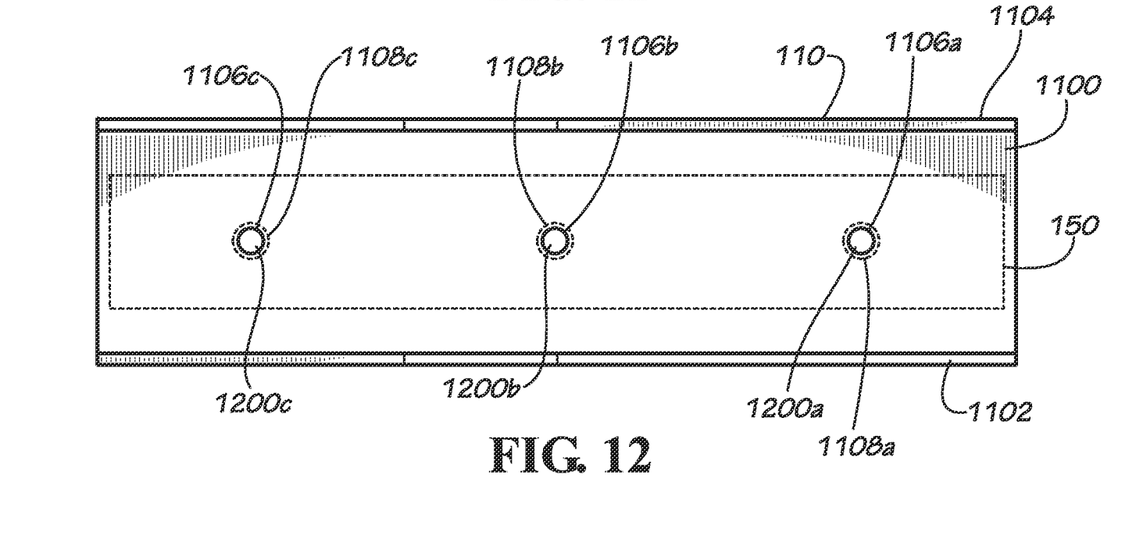
FIG. 12 is a top view of the pipe shoe of FIG. 1.

FIG. 12 shows a top view of the shoe 110. As shown in FIG. 12, in addition to shoe drain hole 1106a, the shoe 110 further defines shoe drain holes 1106b,c in various embodiments. In addition to keeper drain hole 1108a, the keeper 150 further defines keeper drain holes 1108b,c. In various embodiments, the shoe 110 may include plugs 1200a,b,c for selectively opening or closing drain holes 1106a,b,c. In various embodiments, the plugs 1200a,b,c are removable and insertable into the drain holes 1106a,b,c. In various other embodiments, the plugs 1200a,b,c are permanently inserted into the drain holes 1106a,b,c. The number of shoe drain holes 1106, keeper drain holes 1108, or plugs 1200 should not be considered limiting on the current disclosure. In various embodiments, the shoe 110 and keeper 150 are welded together around at least one of the drain holes 1200a,b,c. In various embodiments, the shoe 110 and keeper 150 may not be welded at sides 1110,1112 of the keeper 150 because the sides 1110,1112 of the keeper 150 may interact with rollers 106a,b during operation.

Figure 13:
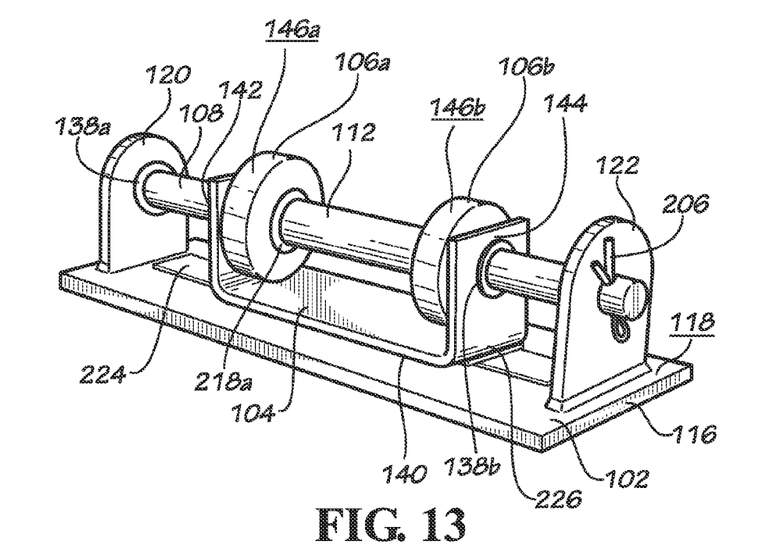
FIG. 13 is a perspective view of the base, pedestal, and roller of FIG. 1.
Figure 14:
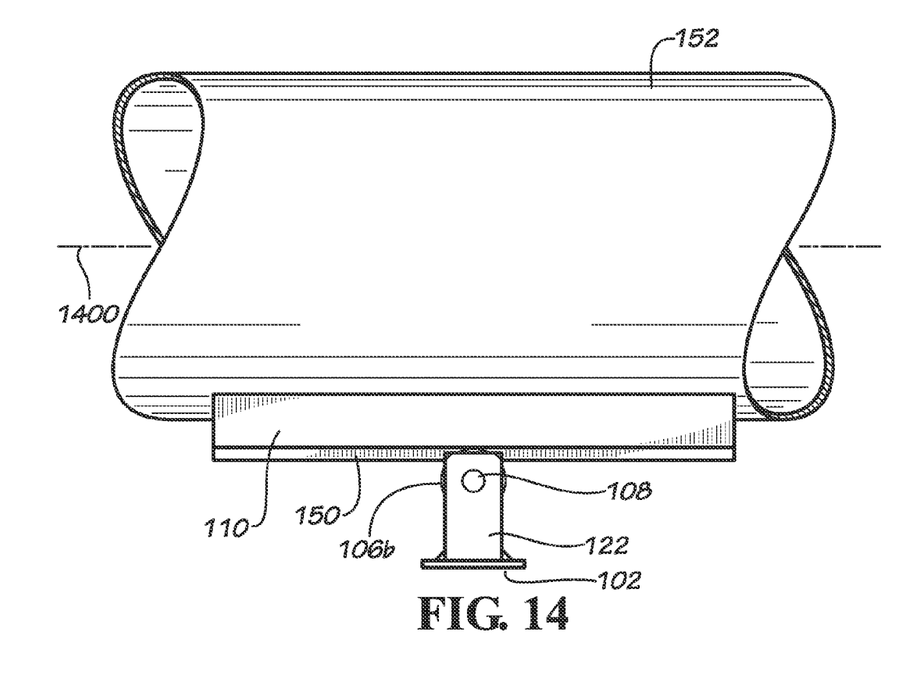
FIG. 14 is a side view of the roller assembly of FIG. 1 with the pipe.

FIG. 13 shows a perspective view of the base 102, pedestal 104, rollers 106a,b, roller shaft 108, and spacer 112. FIG. 14 shows a side view of the roller assembly 100 with the pipe 152 placed on the shoe 110. As shown in FIG. 14, the pipe 152 has a center axis 1400 that extends in a direction that is substantially perpendicular to axis 148. In various embodiments, the shoe 110 and rollers 106a,b facilitates movement of the pipe 152 along axis 1400 and the movement mechanism 220 (shown in FIG. 2) with the pedestal 104 and base 102 facilitates movement the pipe 152 along axis 148.

Referring back to FIGS. 1 and 2, a method of assembling a roller assembly 100 is disclosed. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. The base 102 having the first lug 120 positioned on the base surface 118 proximate to the first end 114 and the second lug 122 positioned on the base surface 118 proximate to the second end 116 is provided.

The pedestal 104 is positioned on the base 102 such that pedestal openings 212,214 are aligned with roller shaft openings 208,210 in the lugs 120,122. In various embodiments where the roller assembly 100 includes the movement mechanism 220, the pedestal 104 is positioned on the base 102 such that the movement mechanism 220 enables movement of the pedestal 104 relative to the base 102 along axis 148. In various embodiments where the movement mechanism 220 is a slide bearing system 222, the first sliding plate 224 of the slide bearing system 222 attached to the pedestal 104 is in contact with the second sliding plate 226 of the slide bearing system 222 attached to the base 102 when the pedestal 104 is positioned on the base 102.

The pedestal 104 is positioned on the base 102, the roller shaft 108 is inserted through the roller shaft opening 208 in the first lug 120. Washers 138a,b are positioned on the roller shaft 108 and the roller shaft 108 is inserted through the first roller shaft opening 212 and washers 138c,d are positioned on the roller shaft 108. The roller 106a is positioned on the roller shaft 108 and washers 138e,f, the spacer 112, and washers 138g,h are positioned on the roller shaft 108. The roller 106b is positioned on the roller shaft 108 along with washers 138i,j.

The roller shaft 108 is inserted through the second roller shaft opening 214 and washers 138k,l are positioned on the roller shaft 108. Roller shaft 108 is inserted through the roller shaft opening 210 in the second lug 122. In various embodiments, a first pin 204 is inserted into the first pin opening 200 and the second pin 206 is inserted into the second pin opening 202. In various embodiments, positioning the first pin 204 and second pin 206 contains the roller shaft 108 on the lugs 120,122.

In various embodiments, the shoe 110 is seated on the rolling surfaces 146a,b of the rollers 106a,b. The rolling surfaces 146a,b enable the shoe to move axially along axis 1400 (shown in FIG. 14). In these embodiments, the shoe 110 is rollable over the rolling surfaces 146a,b. In various embodiments, the shoe 110 is seated such that the keeper 150 is positioned between rollers 106a,b. In various embodiments, positioning the shoe 110 such that the keeper 150 is positioned between rollers 106a,b ensures that shoe 110 remains positioned on the rollers 106a,b. As shown in FIG. 1, a piping element such as a pipe 152 is positioned on the shoe 110.

A method of using the roller assembly 100 is also disclosed. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. The roller assembly 100 including the base 102, pedestal 104, rollers 106a,b, and shoe 110 is initially provided.

A piping element such as pipe 152 is then positioned on the seat 110 such that the roller assembly 100 supports the pipe 152. In various piping systems of which pipe 152 is part of, a change in temperature of the pipe 152, such as a change resulting in thermal expansion, may cause the pipe 152 to move along axis 148 and/or 1400. In various embodiments, the roller assembly 100 enables the pipe 152 to be movably positioned along axis 148 and axis 1400.

To move the pipe 152 along axis 148, the pipe 152 is moved along axis 148 to cause the keeper 150 to contact roller 106a or roller 106b. After the keeper 150 contacts roller 106a or 106b, the roller 106a or 106b contacts the pedestal 104 to move the pedestal 104, rollers 106a,b, and spacer 112 on the roller shaft 108 along axis 148. Movement along axis 148 between the base 102 and pedestal 104 is facilitated by the movement mechanism 220 such as slide bearing system 222. In these embodiments, the pedestal 104 with first sliding plate 224 having sliding surface 700 is slidably positioned along the sliding surface 510 of the second sliding plate 226 attached to the base 102. In various embodiments, to move the pipe 152 along axis 1400, the pipe 152 is moved along axis 1400 causing the shoe 110 to move along rolling surface 146a,b and cause rollers 106a,b to rotate.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A roller assembly comprising:
   a base;
   a shaft mounted on the base, the shaft defining an axis;
   a pedestal positioned on the shaft, the pedestal movable axially along the axis relative to the shaft, the pedestal rotationally fixed about the axis; and
   a roller fixably positioned relative to the pedestal and movable axially along the axis relative to the shaft, the roller rotatably positioned on the shaft.

2. The roller assembly of claim 1, wherein the roller is a first roller, the roller assembly further comprising a second roller fixably positioned relative to the pedestal and movable axially relative to the shaft.

3. The roller assembly of claim 2, further comprising a spacer between the first roller and the second roller.

4. The roller assembly of claim 1, wherein the pedestal includes a bottom panel, a first arm, and a second arm, the roller fixably positioned relative to the pedestal between the first arm and the second arm of the pedestal and above the bottom panel of the pedestal.

5. The roller assembly of claim 1, wherein the base includes a first lug and a second lug, the shaft supported by the first lug and the second lug, the pedestal movably positioned on the shaft between the first lug and the second lug and the roller movable axially relative to the shaft between the first lug and the second lug.

6. The roller assembly of claim 1, wherein a first arm and a second arm of the pedestal are movably positioned on the shaft and a bottom panel of the pedestal is movably positioned on the base.

7. The roller assembly of claim 1, further comprising a slide bearing, the slide bearing including a first plate attached to the base and a second plate attached to the pedestal.

8. The roller assembly of claim 7, wherein the first sliding plate is attached to the base between a first lug and a second lug and the second sliding plate is attached to a bottom panel of the pedestal between a first arm and a second arm of the pedestal.

9. The roller assembly of claim 7, wherein the first plate and the second plate are constructed from a material including polytetrafluoroethylene (PTFE) and glass fiber.

10. The roller assembly of claim 1, wherein the roller defines a roller surface, the roller assembly further comprising a pipe shoe, the pipe shoe rollable over the roller surface.

11. The roller assembly of claim 1, wherein the roller is positioned on a bearing configured to rotate.

12. The roller assembly of claim 1, wherein the roller defines a tapered edge.

13. The roller assembly of claim 1, wherein the shaft is axially fixed relative to the base.

14. The roller assembly of claim 1, wherein a plurality of washers are configured to prevent direct contact between the pedestal and the roller.

15. The roller assembly of claim 3, wherein the first roller and the second roller each define a roller surface, the roller assembly further comprising a pipe shoe, the pipe shoe configured to roll over the roller surfaces of the first roller and the second roller.

16. The roller assembly of claim 5, wherein the first lug and the second lug extend vertically upward from and perpendicular to a top surface of the base.

17. The roller assembly of claim 15, wherein the pipe shoe further comprises a keeper disposed on a bottom surface of the pipe shoe and positioned between the first roller and the second roller and above the spacer.

* * * * *